United States Patent
Taylor et al.

(10) Patent No.: US 7,584,080 B2
(45) Date of Patent: Sep. 1, 2009

(54) CONSTRUCTING A STATISTICAL SHAPE MODEL FROM TWO-DIMENSIONAL OR THREE-DIMENSIONAL DATA

(75) Inventors: Christopher J. Taylor, Stockport (GB); Rhodri Davies, Manchester (GB); Timothy F. Cootes, Stockport (GB); Carole Twining, Manchester (GB)

(73) Assignee: Imorphics Limited, Manchester (GB)

( * ) Notice: Subject to any disclaimer, the term of this patent is extended or adjusted under 35 U.S.C. 154(b) by 109 days.

(21) Appl. No.: 10/480,445

(22) PCT Filed: Dec. 6, 2001

(86) PCT No.: PCT/GB01/05408

§ 371 (c)(1),
(2), (4) Date: Aug. 25, 2004

(87) PCT Pub. No.: WO02/103618

PCT Pub. Date: Dec. 27, 2002

(65) Prior Publication Data

US 2005/0027492 A1 Feb. 3, 2005

(30) Foreign Application Priority Data

Jun. 12, 2001 (GB) ................................ 0114271.0

(51) Int. Cl.
*G06F 7/60* (2006.01)
(52) U.S. Cl. .......................................................... 703/2
(58) Field of Classification Search .................... 703/2; 382/154, 160
See application file for complete search history.

(56) References Cited

U.S. PATENT DOCUMENTS

| | | | | |
|---|---|---|---|---|
| 5,822,451 A | * | 10/1998 | Spaulding et al. | 382/162 |
| 6,633,686 B1 | * | 10/2003 | Bakircioglu et al. | 382/294 |
| 2001/0020946 A1 | * | 9/2001 | Kawakami et al. | 345/582 |
| 2002/0169772 A1 | * | 11/2002 | Aggarwal | 707/6 |

FOREIGN PATENT DOCUMENTS

WO    01 35326 A    5/2001

OTHER PUBLICATIONS

Lorenz et al., 3D Statistical Shape Models for Medical Image Segmentation, Oct. 1999, IEEE, pp. 414-423.*
Sclaroff et al., Deformable Shape Detection and Description via Model-Based Region Grouping, May 2001, IEEE, pp. 475-489.*

(Continued)

*Primary Examiner*—Paul L Rodriguez
*Assistant Examiner*—Eunhee Kim
(74) *Attorney, Agent, or Firm*—Nixon & Vanderhye PC

(57) ABSTRACT

A statistical shape model is built by automatically establishing correspondence between a set of two dimensional shapes or three dimensional shapes. A parameterization of each shape is determined and, a statistical shape model is built using the parameterization. An objective function is used to provide an output which indicates the quality of the statistical shape model. By performing these steps repeatedly for different parameterizations and comparing the quality of the resulting statistical shape models using output of the objective function to determine which parameterization provides the statistical shape model having the best quality, the output of the objective function is a measure of the quantity of information required to code the set of shapes using the statistical shape model.

34 Claims, 13 Drawing Sheets

The first three modes of variation (±2σ) of the automatically generated hand model

OTHER PUBLICATIONS

Sclaroff et al., Deformable Shape Detection and Description via Model-Based Region Grouping, Jun. 1999, IEEE, pp. 27 vol. 2.*

Zapata et al., Deformable Shapes Detection by Stochastic Optimization, Sep. 2000, IEEE, pp. 780-783.*

Gerig et al., Elastic Model-Based Segmentation of 3-D Neuroradiological Data Sets, Oct. 1999, IEEE, pp. 828-839.*

Behiels et al., Statistical shape model-based segmentation of digital X-ray, Jun. 2000, IEEE, pp. 61-68.*

Storvik, A Bayesian approach to dynamic contours through stochastic sampling and simulated annealing, Oct. 1994, IEEE, pp. 976-986.*

Taylor et al., Automatic construction of eigenshape models by direct optimization, Dec. 1998, Medical Image Analysis, vol. 2, Issue 4, pp. 303-314.*

Stettiner O et al; "A statistical parametric model for recognition and synthesis of handwriting" Proceedings of the 12$^{th}$ IAPR International Conference on Pattern Recognition (Cat. No. 94CH3440-5). Proceeding of 12$^{th}$ International Conference on Pattern Recognition, Jerusalem, Israel, Oct. 9-13, 1994, pp. 34-38 vol. 2, XP000509878 1994, Los Alamitos, CA, USA, IEEE Comput. Soc. Press, USA ISBN: 0-8186-6270-0 p. 36, left-hand col., paragraph 4—p. 37, left-hand col., paragraph 5.

Lorenz C et al: "3D statistical shape models for medical image segmentation" Second International Conference on 3-D Digital Imaging and Modeling (Cat. No. PR00062), Second International Conference on 3-D Digital Imaging and Modeling. Ottawa, Ont., Canada. Oct. 4-8, 1999, pp. 414-423, XP010358781 1999, Los Alamitos, CA, USA, IEEE Comput. Soc., USA ISBN: 0-7695-0062-5 p. 2, right-hand col., paragraph 2—p. 3, right-hand col., paragraph 3.2.

Davies et al., "An Efficient Method for Constructing Optimal Statistical Shape Models", W. Niessen and M. Viergever (Eds.): MICCAI2001, LNCS 2208, pp. 57-65, 2001.

Davies et al., "A Minimum Description Length Approach to Statistical Shape Modelling", M.F. Insana, R.M. Leahy (Eds.): IPMI2001, LNCS 2082, pp. 50-63, 2001.

Davies et al., "An Information Theoretic Approach to Statistical Shape Modelling", 2001.

Frangi et al., "Automatic 3D ASM Construction via Atlas-Based Landmarking and Volumetric Elastic Registration", Information Processing in Medical Imaging. 17$^{th}$ International Conference, IPMI 2001, Proceedings (Lecture Notes in Computer Science vol. 2082), Information Processing in Medical Imaging, 17$^{th}$ International Conference, IPMI 2000, Proceedings, Davis, CA, pp. 78-91, XP00220439.1 2001, Berlin, Germany, Springer-Verlag, Germany ISBN: 3-540-42245-5.

Lanitis et al., "An Automotive Face Identification System Using Flexible Appearance Models", Proceedings of the British Machine Vision Conference, XX, XX, vol. 1, 1994, pp. 65-74, XP000884682, p. 67, paragraph 3.1—p. 70, paragraph 8.

* cited by examiner

The first three modes of variation (±2σ) of a model

The first three modes of variation (±2σ) of a model

FIG.3a   FIG.3b   FIG.3c   FIG.3d
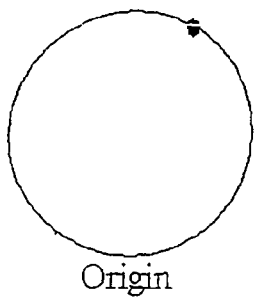
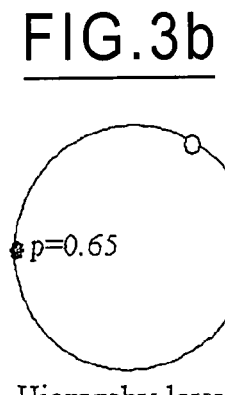
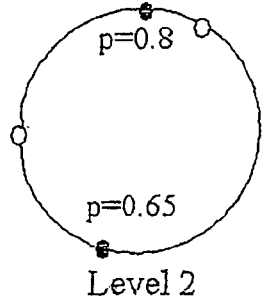
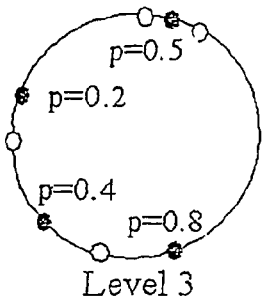
Origin   Hierarchy level 1   Level 2   Level 3
A diagram that demonstrates the parameterisation of a circle. The hollow points represent the landmarks that are already in place. $\Phi_i$ = (Origin, 0.65 (0.65 (0.4, 0.8), 0.8 (0.5, 0.2)).
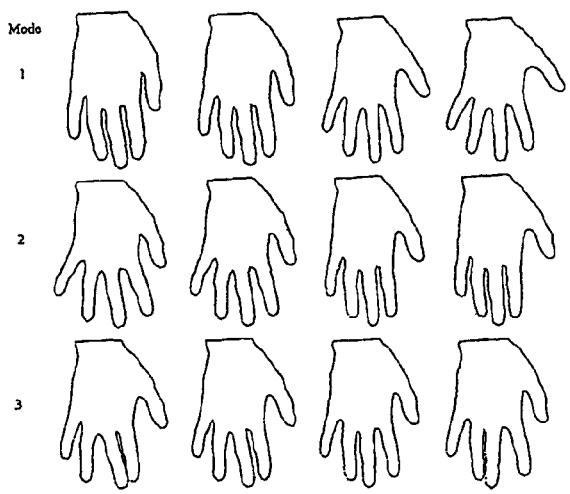
The first three modes of variation (±2σ) of the automatically generated hand model
FIG.4

The first three modes of variation (±2σ) of the automatically generated heart model The first three modes of variation (±2σ) of the automatically generated hip model A diagram to demonstrate how each point is added to the surface. The hollow points are those that are already present on the sphere. This is a simplification, as on a sphere, the triple of points would form a *spherical* triangle $F_{min}$ increases with the s.d. of random perturbations of the 'optimal' correspondences (a) Iteration 1    (b) Iteration 2    (c) Iteration 3    (d) The Final Set of Control Points A Demonstration of Parameterising a Circle. The 'X' represents the origin, the circles represent the current (flexible) control points and the squares represent the fixed control points. At each iteration, the current control points are allowed to move between the endpoints of the arrow The first three modes ($j = 1, j = 2, j = 3$) of variation ($\pm 2\sigma$) of the automatically generated models

FIG.13a  Table 1a

Hands

| Mode | Manual | Equally Spaced | Automatic |
|---|---|---|---|
| 1 | 9.34 | 20.74 | 8.438 |
| 2 | 5.12 | 7.4 | 4.61 |
| 3 | 2.41 | 5.13 | 2.1 |
| 4 | 1.38 | 3.15 | 1.36 |
| 5 | 0.67 | 1.71 | 0.44 |
| 6 | 0.49 | 1.21 | 0.34 |
| $v_T$ | 20.68 | 41.21 | 18.64 |
| $F$ | 18020 | 19114 | 17304 |

FIG.13b  Table 1b

Heart Ventricles

| Mode | Manual | Equally Spaced | Automatic |
|---|---|---|---|
| 1 | 2.4852 | 1.8999 | 1.9745 |
| 2 | 1.356 | 1.2095 | 1.13 |
| 3 | 0.5723 | 0.6982 | 0.6562 |
| 4 | 0.4946 | 0.4861 | 0.3369 |
| 5 | 0.1714 | 0.3188 | 0.1848 |
| 6 | 0.1402 | 0.1679 | 0.1277 |
| $v_T$ | 5.58 | 5.35 | 4.785 |
| $F$ | 15408 | 17714 | 13932 |

FIG. 13c   Table 1c

Hip Prostheses

| Mode | Manual | Equally Spaced | Automatic |
|---|---|---|---|
| 1 | 3.0066 | 2.5039 | 2.4554 |
| 2 | 1.1421 | 0.9497 | 0.9392 |
| 3 | 0.8071 | 0.1867 | 0.2523 |
| 4 | 0.4303 | 0.0796 | 0.0812 |
| 5 | 0.1525 | 0.0405 | 0.0404 |
| 6 | 0.1204 | 0.0256 | 0.0341 |
| $V_T$ | 58.9 | 39.1 | 38.4 |
| F | 34447 | 18525 | 17167 |

A quantitative comparison of each model showing the variance explained by each mode. $F_{min}$ is the value of the objective function and $V_T$ is the total variance.

FIG.14a  Table 2a

Hands

| Mode | Automatic | Hand Built | Equally Spaced |
|---|---|---|---|
| 1 | 2.75 | 4.19 | 8.65 |
| 2 | 1.67 | 2.29 | 3.08 |
| 3 | 0.98 | 1.20 | 2.13 |
| 4 | 0.44 | 0.99 | 1.31 |
| 5 | 0.18 | 0.30 | 0.71 |
| 6 | 0.11 | 0.28 | 0.51 |
| $V_T$ | 6.32 | 9.92 | 17.18 |
| $F_{min}$ | 6645 | 8177 | 9072 |

FIG.14b  Table 2b

Hip Prostheses

| Mode | Automatic | Hand Built | Equally Spaced |
|---|---|---|---|
| 1 | 2.91 | 8.75 | 8.71 |
| 2 | 1.79 | 3.91 | 3.79 |
| 3 | 1.09 | 0.84 | 0.54 |
| 4 | 0.12 | 0.11 | 0.09 |
| 5 | 0.10 | 0.05 | 0.06 |
| 6 | 0.04 | 0.03 | 0.02 |
| $V_T$ | 6.08 | 13.7 | 13.2 |
| $F_{min}$ | 3377 | 16443 | 11366 |

FIG.14c  Table 2c

Knee Cartlidge

| Mode | Automatic | Hand Built | Equally Spaced |
|---|---|---|---|
| 1 | 5.97 | 8.04 | 8.44 |
| 2 | 1.44 | 1.30 | 1.37 |
| 3 | 0.25 | 0.67 | 0.70 |
| 4 | 0.23 | 0.23 | 0.24 |
| 5 | 0.15 | 0.18 | 0.19 |
| 6 | 0.09 | 0.11 | 0.11 |
| $V_T$ | 8.31 | 10.7 | 11.3 |
| $F_{min}$ | 2478 | 3517 | 3567 |

FIG.14d    Table 2d

*Heart Ventricles*

| Mode | Automatic | Hand Built | Equally Spaced |
|---|---|---|---|
| 1 | 2.61 | 4.99 | 6.52 |
| 2 | 0.93 | 3.17 | 3.56 |
| 3 | 0.50 | 1.83 | 1.50 |
| 4 | 0.26 | 1.28 | 1.30 |
| 5 | 0.17 | 0.84 | 0.45 |
| 6 | 0.14 | 0.44 | 0.37 |
| $V_T$ | 4.9 | 14.1 | 14.6 |
| $F_{min}$ | 2478 | 3517 | 3567 |

A quantitative comparison of each model showing the variance explained by each mode. $F_{min}$ is the value of the objective function and $V_T$ is the total variance.

FIG.15a  Table 3a

Hands

| Mode | Automatic | Hand Built | Equally-spaced |
|---|---|---|---|
| 1 | 1.20 | 2.13 | 4.39 |
| 2 | 0.68 | 1.16 | 1.56 |
| 3 | 0.39 | 0.61 | 1.08 |
| 4 | 0.21 | 0.50 | 0.67 |
| 5 | 0.08 | 0.15 | 0.36 |
| 6 | 0.04 | 0.14 | 0.26 |
| $V_T$ | 2.69 | 5.04 | 8.72 |
| $F$ | 31477 | 41563 | 45272 |

FIG.15b  Table 3b

Hip Prostheses

| Mode | Automatic | Hand Built | Equally-spaced |
|---|---|---|---|
| 1 | 3.5423 | 21.159 | 37.287 |
| 2 | 1.2483 | 9.745 | 6.644 |
| 3 | 0.5333 | 1.758 | 2.123 |
| 4 | 0.2271 | 0.469 | 0.583 |
| 5 | 0.0661 | 0.309 | 0.425 |
| 6 | 0.0149 | 0.114 | 0.14 |
| $V_T$ | 5.67 | 33.37 | 57.3 |
| $F$ | 3101 | 7279 | 11152 |

FIG.15c  Table 3c

Knee Cartilage

| Mode | Automatic | Hand Built | Equally-spaced |
|---|---|---|---|
| 1 | 690.80 | 803.74 | 807.89 |
| 2 | 68.97 | 129.56 | 136.43 |
| 3 | 32.15 | 66.78 | 69.83 |
| 4 | 17.37 | 22.85 | 23.07 |
| 5 | 11.56 | 17.96 | 18.06 |
| 6 | 8.41 | 10.71 | 11.63 |
| $V_T$ | 847.92 | 1073.4 | 1124.1 |
| $F$ | 25133 | 35969 | 37941 |

FIG.15d  Table 3d

Heart Ventricles

| Mode | Automatic | Hand Built | Equally-spaced |
|---|---|---|---|
| 1 | 2.03 | 4.97 | 3.80 |
| 2 | 1.04 | 2.71 | 2.42 |
| 3 | 0.57 | 1.14 | 1.40 |
| 4 | 0.16 | 0.99 | 0.97 |
| 5 | 0.09 | 0.34 | 0.64 |
| 6 | 0.07 | 0.28 | 0.34 |
| $V_T$ | 4110 | 11201 | 10704 |
| $F$ | 27382 | 43732 | 44949 |

A quantitative comparison of each model showing the variance explained by each mode. $F$ is the value of the objective function and $V_T$ is the total variance.

CONSTRUCTING A STATISTICAL SHAPE MODEL FROM TWO-DIMENSIONAL OR THREE-DIMENSIONAL DATA

BACKGROUND

1. Technical Field

The present invention relates to a statistical shape model, and to the parameterization of a set of shapes used for the statistical shape model.

2. Related Art

Statistical models of shape have been used for some time to provide automated interpretation of images. See, for example, Cootes, T, A. Hill, and C. Taylor, *The use of Active shape models for locating structures in medical images*. Image and Vision Computing, 1994, 12: p. 355-366. The basic idea used by the models is to establish, from a training set, a pattern of "legal" variation in the shapes and spatial relationships of structures on a given class of images (the class of images may be for example face images, or hand images, etc.). Statistical analysis is used to give an efficient parametensation of the pattern of legal variation, providing a compact representation of shape. The statistical analysis also provides shape constraints which are used to determine whether the shape of a structure in an analysed image is a plausible example of the object class of interest. See, for example: Coates, T., et al., *Active shape models—the training and application*, Computer Vision and Image Understanding, 1995. 61: p. 38-59.

One of the main drawbacks to statistical shape models is the need, during training, to establish dense correspondence between shape boundaries for a reasonably large set of example images. It is important to establish the 'correct' correspondence, i.e. a landmark should represent the same location for each of the images used to generate the model (for example a landmark could be located at the inner corner of the left eye). If 'correct' correspondences are not established, an inefficient model of shape can result, leading to difficulty in defining shape constraints. In other words, the model will not correctly determine whether the shape of a hypothesised structure in an analysed image represents a plausible example of the object class of interest. The problem of establishing correspondence can be viewed as one of finding an appropriate parameterisation of the shape. The term parameterisation refers to the process of defining a one-to-one correspondence between values of one or more parameters and position on the shape so that a given value of the parameter (or parameters) defines a unique location on the shape. For example, a single parameter can define position around a closed boundary, whilst two parameters are required to define position on a closed surface (in 3D) of spherical topology.

In practice, correspondence has been established for training images by using manually defined 'landmarks'. In 2D this defines a piecewise linear parameterisation of each shape, with equivalent landmarks for the different shapes corresponding by definition and intermediate sections of shape boundary parameterised as a linear function of path length. Shape models generated in this way have been found to function reasonably well. However, there are several disadvantages associated with manually defining landmarks. Firstly, in a general a large number of images must be annotated in order to generate an accurate model, and manually defining landmarks for each image is very time consuming. A second disadvantage is that manually defining the landmarks unavoidably involves an element of subjective judgement when determining exactly where to locate each landmark, and this will lead to some distortion of the model. The disadvantages are exacerbated when manually defining landmarks for 3-D images, since the number of landmarks per image increases significantly.

The impact of parameterisation upon the generation of a two-dimensional (2D) model is illustrated in the following example:

A 2-D statistical shape model is built from a training set of example shapes/boundaries. Each shape, $S_i$, can (without loss of generality) be represented by a set of (n/2) points sampled along the boundary at equal intervals, as defined by some parameterisation $\Phi_i$ of the boundary path.

Using Procrustes analysis [e.g., see Goodall, C., *Procrustes Methods in the Statistical Analysis of Shape*. Journal of the Royal Statistical Society, 1991, 53(2): p. 285-339] the sets of points can be rigidly aligned to minimize the sum of squared differences between corresponding points. This allows each shape $S_i$ to be represented by an n-dimensional shape vector $x_i$, formed by concatenating the coordinates of its sample points, measured in a standard frame of reference. Using Principal Component analysis, each shape vector can be approximated by a linear model of the form $$x = \bar{x} + Pb \qquad (1)$$

where x is the mean shape vector, the columns of P describe a set of orthogonal modes of shape variation and b is a vector of shape parameters. New examples of the class of shapes can be generated by choosing values of b within the range found in the training set. This approach can be extended easily to deal with continuous boundary functions [e.g., see Kotcheff, A. C. W. and C. J. Taylor, *Automatic Construction of Eigenshape Models by Direct Optimisation*. Medical Image Analysis, 1998, 2: p. 303-314.], but for clarity is limited here to the discrete case.

The utility of the linear model of shape shown in (1) depends on the appropriateness of the set of boundary parameterisations $\{\Phi_i\}$ that are chosen. An inappropriate choice can result in the need for a large set of modes (and corresponding shape parameters) to approximate the training shapes to a given accuracy and may lead to 'legal' values of b generating 'illegal' shape instances. For example, consider two models generated from a set of 17 hand outlines. Model A uses a set of parameterisations of the outlines that cause 'natural' landmarks such as the tips of the fingers to correspond. Model B uses one such correspondence but then uses a simple path length parameterisation to position the other sample points. The variance of the three most significant modes of models A and B are (1.06, 0.58, 0.30) and (2.19, 0.78, 0.54) respectively. This suggests that model A is more compact than model B. All the example shapes generated by model A using values of b within the range found in the training set of 'legal' examples of hands, whilst model B generates implausible examples This is illustrated in FIGS. 1a and 1b.

The set of parameterisations used for model A were obtained by marking 'natural' landmarks manually on each training example, then using simple path length parameterisation to sample a fixed number of equally spaced points between them. This manual mark-up is a time-consuming and subjective process. In principle, the modelling approach extends naturally to 3-D, out in practice manual landmarking becomes impractical.

Several previous attempts have been made to automate model generation [3-6] by the automatic location of landmarks for training images See, for example: Brett. A. D. and C. J. Taylor, *A Method of Automatic Landmark Generation for 3D PDM Construction*. Image and Vision Computing, 2000. 18(9): p. 739-748; Hill, A. and C. Taylor. *Automatic Land-* mark generation for point distribution models in British Machine Vision conference. 1994, Birmingham, England, BMVA Press; Hill, A. and C. J. Taylor. *A Framework for automatic landmark identification using a new method of non-rigid correspondence*. IEEE Transactions on Pattern Analysis and Machine Intelligence, 2000; Kotcheff A. C. W. and C. J. Taylor, *Automatic Construction of Eigenshape Models by Direct Optimisation*. Medical Image Analysis, 1998, 2: p. 303-314. Each of these attempts suffers from disadvantages, as set out below.

Various authors have described attempts to automate the construction of statistical shape models from a set of training shapes. The simplest approach is to select a starting point and equally space landmarks along the boundary of each shape. This is advocated by Baumberg and Hogg, *Learning Flexible Models from Image Sequences, in $3^{rd}$ European Conference on Computer Vision*, Stockholm, Sweden. 1994, p. 299-308 but it does not generally result in a satisfactory model. Kelemen et al use spherical harmonic descriptors to parameterize their training shapes. Although it is independent of origin, this is equivalent to an arbitrary parameterisation of the boundary, and it is not based upon a consideration of the optimal arrangement of landmarks.

Benayoun et al. [*Adaptive meshes and nonrigid motion computation in International Conference on Pattern Recognition*, 1994, Jerusalem, Israel] and Kambhamettu and Goldgof [*Point Correspondence Recovery in Non-rigid Motion, in IEEE Conference on Computer Vision and Pattern Recognition*, 1992. p. 222-227] use curvature information to select landmark points. However, there is a risk that corresponding points will not lie on regions that have the same curvature. Also, since these methods only consider pairwise correspondences, they may not find the best global solution.

A more robust approach to automatic model building is to tret the task as an optmisation problem. Hill and Taylor [*Automatic landmark generation for point distribution in models, in British Machine Vision Conference*. 1994. Birmingham, England: BMVA Press.] attempt this by minimizing the total variance of a shape model. They choose to iteratively perform a series of local optmisations, re-building the model at each stage. Unfortunately, this makes the approach prone to becoming trapped in local minima and consequently depends on a good initial estimate of the correct landmark positions. Rangarajan et al [*The softassign Procrustes Matching Algorithm, in $15^{th}$ Conference on information Processing in Medical imaging*. 1997, p. 29-42] describe a method of shape correspondence that also minimizes the total model variance by simultaneously determining a set of correspondences and the similarity transformation required to register pairs of contours. This method is not based upon a consideration of the optimal arrangement of landmarks.

Bookstein [*Landmark Methods for forms without landmarks: morphometrics of group differences in outline shape*. Medical Image Analysis. 1997, 1(3): p. 225-243] describes an algorithm for landmarking sets of continuous contours represented as polygons. Points are allowed to move along the contours so as to minimize a bending energy term. The parameterisation is not based upon a consideration of the optimal arrangements of landmarks, and instead the arrangement of the landmarks is merely arbitrary.

Kotcheff and Taylor [*Automatic construction of Eigenshape Models by Direct Optimisation. Medical Image Analysis*, 1998. 2: p. 303-314] describe an approach which attempts to define a best model in terms of 'compactness', as measured by the determinant of the model's covariance matrix. They represented the parameterisation of each of a set of training shapes explicitly, and used a genetic algorithm search to optimize the model with respect to the parameterisation. Although this work showed promise, there were several problems. The objective function, although reasonably intuitive, could not be rigorously justified. The method was described for -D shapes and could not easily be extended to 3-D. It was sometimes difficult to make the optimization converge. A further disadvantage is that a required accuracy value had to be selected in order to make the algorithm work correctly. The choice of accuracy value had a direct impact upon the parameterisation chosen. Consequently, different accuracy values were appropriate for different models, and a user was required to select an accuracy value during initiation of the model.

BRIEF SUMMARY

It is an object of an exemplary embodiment of the present invention to provide a method of parameterization of a statistical shape model which overcomes or substantially mitigates at least one of the above disadvantages.

According to an exemplary embodiment of the invention there is provided a method of building a statistical shape model by automatically establishing correspondence between a set of two dimensional shapes or three dimensional shapes, the method comprising:

a. determining a paramaterisation of each shape, building a statistical shape model using the parameterisation, using an objective function to provide an output which indicates the quality of the statistical shape model, b. performing step a repeatedly for different parameterisations and comparing the quality of the resulting statistical shape models using output of the objective function to determine which parameterisation provides the statistical shape model having the best quality, wherein the output of the objective function is a measure of the quantity of information required to code the set of shapes using the statistical shape model.

The inventors have realised that the Objective Function may be based upon the key insight that the 'best' model is that which provides coding of the set of shapes as efficiently as possible. The inventors have thus devised a new function with a rigorous theoretical basis which allows different parameterisations to be easily compared.

Preferably, the parameterisations used to perform step a are selected using an optimisation method based upon previous parameterisations and the quality of the statistical shape models generated using those parameterisations as indicated by the output of the objective function.

Preferably, the output of the objective function comprises a value indicative of the amount of information required to code parameters of the model, and a value indicative of the information required to code residuals for the set of shapes.

The term 'residual' is intended to mean information that is required in order to represent all of the images of the training set to an arbitrary accuracy, and which is not included in the model itself.

Preferably, the output of the objective function further comprises a value indicative of the amount of information required to code mapping between parameters and the shapes.

Preferably, for a given parameterisation the objective function provides a single scalar output.

Preferably, the single scalar output comprises a combination of the value indicative of the amount of information required to code parameters of the model, the value indicative of the information required to code residuals for the set of shapes, and the value indicative of the amount of information required to code mapping between parameters and the shapes.

Preferably, the mapping comprises a mean vector and a covariance matrix.

Preferably, the parameters of the model are parameter vectors, and the average amount of information per parameter vector is determined and multiplied by the number of shapes in the training set, to provide the value indicative of the amount of information required to code parameters of the model.

Preferably, the residuals are residual vectors, and the average amount of information per residual vector is determined and multiplied by the number of shapes in the training set, to provide the value indicative of the information required to code residuals for the complete set of training shapes.

Preferably, the number of residuals in each residual vector is twice the number of parameterisations used to generate the model.

Preferably, the number of modes of variation of the model is selected to represent the training set to a given accuracy.

Preferably, the boundary of each two-dimensional shape of the training set is recursively subdivided by inserting landmarks, the parameterisation of the boundary being represented by the position of each landmark as a fraction of boundary path length between preceding and following landmarks.

Preferably, the parameterisation which provides the best optimisation value is determined using a stochastic optimisation method.

Preferably, a set of curves is used to determine a parameterisation function for the training set.

Preferably, the set of curves is a cumulative density function.

Preferably, the cumulative density function comprises a sum of kernel curves.

Preferably, the cumulative density function is determined by combining increasing numbers of kernel curves to provide increasing resolution levels, and the parameterisation function which provides the statistical shape model of the best quality is determined using the output of the objective function for each resolution level.

Preferably, the kernel curves are Gaussian functions.

Preferably, the kernel curves are Cauchy functions.

Preferably, the kernel curves are two dimensional curves.

Preferably, the kernel curves are three dimensional curves.

Preferably, the boundary of each shape of the training set is parameterised by specifying a set of control landmarks used to determine a parameterisation function.

Preferably, the parameterisation function is determined for increasing numbers of control landmarks to provide increasing resolution levels, and the parameterisation function which provides the statistical shape model of the best quality is determined using the output of the objective function for each resolution level.

Preferably, equally spaced landmarks are provided between the control landmarks.

Preferably, the shape and grey-level appearance are both included in the model.

According to a second aspect of the invention there is provided a method of parameterising a set of three dimensional shapes, the method comprising:

a. mapping each three dimensional shape to a simple canonical form of an appropriate topology,
b. applying a set of landmarks to the simple form for a given level of resolution, each landmark being constrained to lie inside a spherical triangle formed by a triple of landmark points of a lower resolution level,
c. upon the completion of the application of the set of landmarks for the resolution level, projecting the set of landmarks onto the three dimensional shapes,
d. building a statistical shape model using the set of landmarks of the resolution level,
e. using an objective function to provide an output which indicates the quality of the statistical shape model determined using the set of landmarks of the resolution level,
f. comparing the output with output determined using a different set of landmarks having the same level of resolution, and
g. repeating steps a to f to determine which set of landmarks which provides the best quality of statistical shape model,
h. repeating steps a to g at a higher level of resolution.

According to a third aspect of the invention there is provided a method of parameterising a set of three dimensional shapes, the method comprising:

a. mapping each three dimensional shape to a simple canonical form of an appropriate topology,
b. applying a set of landmarks to the simple form,
c. modifying the locations of the landmarks by applying a transformation,
d. projecting the set of landmarks onto the three dimensional shapes,
e. building a statistical shape model using the set of landmarks,
f. using an objective function to provide an output which indicates the quality of the statistical shape model determined using the set of landmarks,
g. comparing the output with output determined using landmarks having different locations, and
h. repeating steps c to g to determine which set of landmarks which provides the best quality of statistical shape model.

Preferably, the transformation comprises for a selected landmark pushing other landmarks away from the selected landmark along the surface of the simple form, or pulling other landmarks towards the selected landmark along the surface of the simple form.

Preferably, the transformation is defined by a wrapped kernel.

Preferably, the wrapped kernel is a wrapped Cauchy distribution.

Preferably, the wrapped kernel is a wrapped Gaussian distribution.

Preferably, the simple form is a sphere or a lorus. The simple form may be any other form, and preferably has a shape which generally corresponds with the general shape of the set of three dimensional shapes.

The second aspect of the invention or the third aspect of the invention may include preferred features of the first aspect of the invention.

BRIEF DESCRIPTION OF THE DRAWINGS

A specific embodiment of the invention will now be described by way of example only with reference to the accompanying figures, in which:

FIGS. 3a-d are diagrams which illustrate discrete parameterization by the first embodiment of the invention;

FIGS. 4 to 6 are results obtained using the first embodiment of the invention;

FIGS. 13*a-c* are tables comparing automatic and manual models;

FIGS. 14*a-d* are tables providing further quantitative comparisons between automatic and manual models; and FIGS. 15*a-d* are tables showing further comparisons.

DETAILED DESCRIPTION OF EXEMPLARY EMBODIMENTS

The illustrated embodiment of the invention is based upon a two dimensional (2-D) statistical shape model.

As previously described in the introduction, a 2-D statistical shape model is built from a training set of example shapes/boundaries. Each shape, $S_i$, can (without loss of generality) be represented by a set of (n/2) points sampled along the boundary at equal intervals, as defined by some parameterisation $\Phi_i$ of the boundary path (the term parameterisation refers to the separation of the boundary path into the set of distances along the boundary between the sampled points).

Using Procrustes analysis [12] the sets of points can be rigidly aligned to minimise the sum of squared differences between corresponding points. This allows each shape $S_i$ to be represented by a n-dimensional shape vector $x_i$, formed by concatenating the coordinates of its sample points, measured in a standard frame of reference. Using Principal Component analysis, each shape vector can be approximated by a linear model of the form.

$$x = \bar{x} + Pb \quad (2)$$

where $\bar{x}$ is the mean shape vector, the columns of P describe a set of orthogonal modes of shape variation and b is a vector of shape parameters. New examples of the class of shapes can be generated by choosing values of b within the range found in the training set. This approach can be extended easily to deal with continuous boundary functions [6], but for clarity this embodiment of the invention is limited to the discrete case.

Figures 1A, 1B:
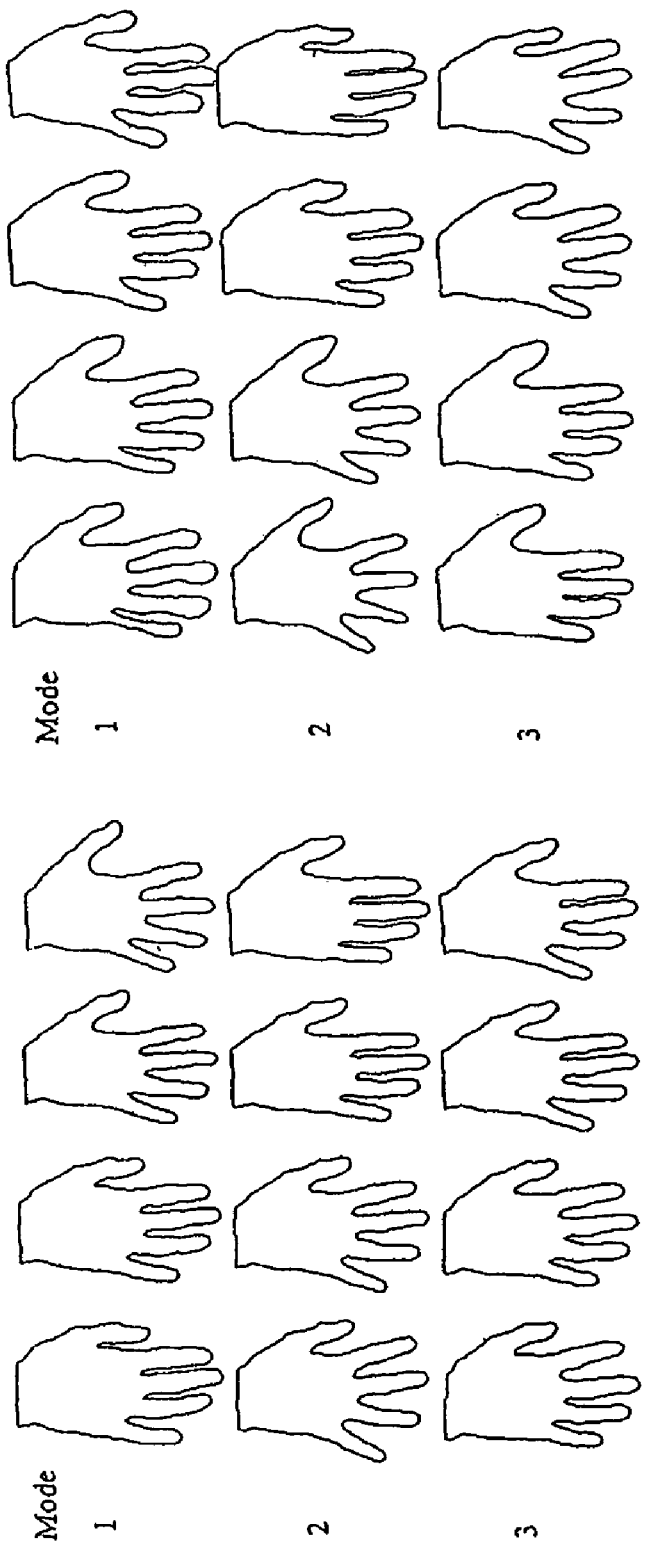
FIGS. 1a-1b are two sets of outputs generated by shape models which use prior art parameterization.
Figure 2:
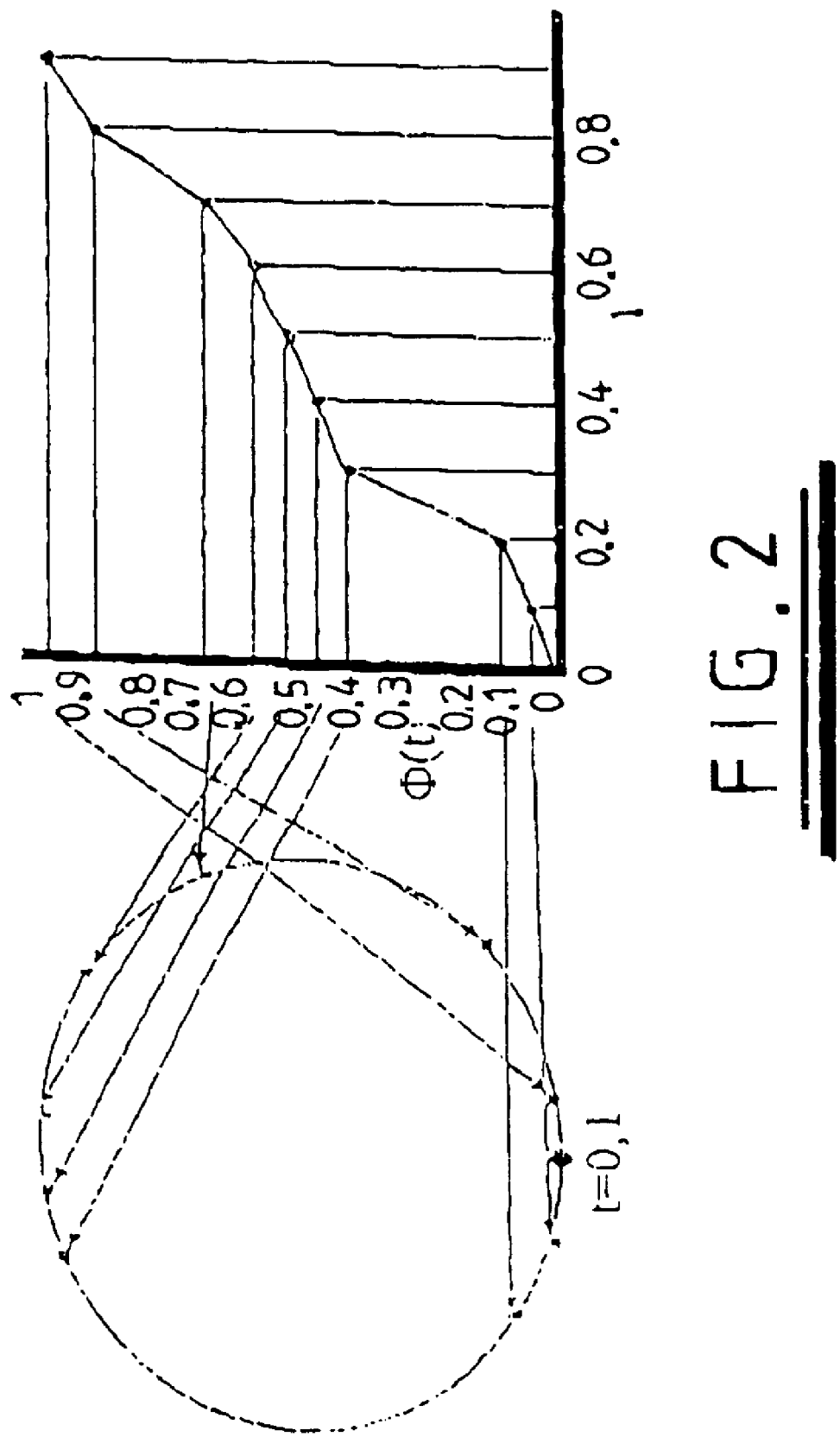
FIG. 2 is a graph which illustrates discrete parameterisation.

An example of how a shape is sampled according to its parameterisation is shown in FIG. 2. The shape is a circle, and the origin used for the parameterisation is the lowermost point on the circle. It has been decided to use ten landmarks to parameterise the circle (including the origin). Referring to the graph shown in FIG. 2, the landmarks are equally spaced along the horizontal axis of the graph which is labelled t (t is in effect a measure of the number of landmarks used to parameterise the circle). The parameterisation of any given landmark is represented by the clockwise distance around the circle between that landmark and the preceding landmark. These distances are represented by the vertical axis of the graph.

The utility of the linear model of the shape shown in (2) depends on the appropriateness of the set of boundary parameterisations $\{\Phi_i\}$ that are used to construct the statistical shape model from the set of training boundaries $\{S_i\}$. The embodiment of the invention defines a criterion for choosing the set of parameterisations $\{\Phi_i\}$. The aim is to choose $\{\Phi_i\}$ so as to obtain the 'best possible' model. Since it is desired to obtain a compact model with good generalisation properties the 'best' model is defined as that which can account for all of the observations (the training boundaries) in as simple a way as possible. In other words, the inventors have based their parameterisation method upon the statement that the 'best' model is that which describes the whole training set as efficiently as possible.

In order to determine which parameterisation is the most efficient a minimum description length criterion is used (i.e. the optimisation method attempts to determine the set of parameterisations which uses the least amount of data to describe the whole training set). This is formalised by stating that it is desired to find $\{\Phi_i\}$ that minimises the information required to code the whole training set to some accuracy $\delta$ on each of the elements of $\{x_i\}$. Note that to describe $\{x_i\}$ to arbitrary accuracy would require infinite information; $\delta$ is chosen to reflect the measurement errors involved in acquiring the training boundaries.

A set $\{S_i\}$ of s training shapes are to be parameterised using $\{\Phi_i\}$ and sampled to give a set of n-dimensional shape vectors $\{x_i\}$. Following (2), $\{x_i\}$ can be approximated to an accuracy of $\delta$ in each of its elements using a linear shape model of the form $$x_i = \bar{x} + Pb_i + r_i \quad (3)$$

Where $\bar{x}$ is the mean of $\{x_i\}$, P has t columns which are the t eigenvectors of the covariance matrix of $\{x_i\}$ corresponding to the t largest eigenvalues $\lambda_j$, $b_i$ is a vector of shape parameters, and $r_i$ is a vector of residuals. The elements of $r_i$ can be shown to have zero mean and a variance of $$\lambda_r = \frac{1}{n}\sum_{j=t+1}^{s} \lambda_j$$

over the training set.

The total information required to code the complete training set of images using this encoding is given by $$I_{Total} = I_{Model} + sI_r + sI_r \quad (4)$$

Where $I_{Model}$ is the information required to code the model (the mean vector $\bar{x}$ and the covariance matrix P), $I_n$ is the average information required to code each parameter vector $b_i$, and $I_r$ the average information required to code each residual vector, $r_i$.

For simplicity, it is assumed that the elements of the mean $\bar{x}$ and the matrix P are uniformly distributed in the range $[-1,1]$, and that $k_m$ bits are used per element for the mean, and $k_j$ bits per element for the $j^{th}$ column of P giving quantisation errors $\delta_m = 2^{-k_m}$ and $\delta_j = 2^{-k_j}$ respectively. Thus $$I_{Model} = nk_m + n\sum_{j=i}^{t} k_j \quad (5)$$

The elements of $b_i$ are assumed to be normally distributed over the training set with zero mean and variance $\lambda_j$. To code them to an accuracy $\lambda_m$ it can be shown [14] that the information required to code each parameter vector $b_i$ is on average $$I_b = \sum_{j=1}^{t} [k_b + 0.5 \log(2\pi e \lambda_j)] \quad (6)$$

Where $k_b = -\log(\delta_b)$. All logs are base 2.

Similarly, to code the n elements of $r_i$ to an accuracy of $\delta_r = 2^{-k_r}$ the information required on average is $$I_r = n[k_r + 0.5 \log(2\pi e \lambda_r)] \quad (7)$$

Substituting (5), (6) and (7) into (4) gives $$I_{Total} = nk_m + n\sum_{j=1}^{t} k_j + \quad (8)$$
$$s\sum_{j=1}^{t} [k_b + 0.5 \log(2\pi e \lambda_j)] +$$
$$sn[k_r + 0.5\log(2\pi e \lambda_r)]$$

This is the total amount of information required to code the complete training set of images using a linear shape model of the form given in (3). It can be seen from (8) that $I_{Total}$ is a function of the quantisation parameters $k_m$, $k_j$, $k_b$, and $k_r$, which are related to $\delta$, the overall approximation error. Since it is desired ultimately to minimise $I_{Total}$ with respect to $\{\Phi_i\}$ it is first required to find the minimum with respect to the quantisation parameters. This can be found analytically, leading to an expression in terms of s, n, t, $\{\lambda_j\}$ and $\lambda_r$.

$$I_{Total} = -0.5(n + nt + st)\log(12\alpha\lambda_r/s) + snk + \quad (9)$$
$$0.5(n + s)\sum_{j=1}^{t} \log(\lambda_j) + 0.5ns\log(\alpha\lambda_r) +$$
$$0.5s(n + t)\log(2\pi e) - 0.5st\log(s)$$

where s is the number of training shapes, n is double the number of points sampled along the boundary of each shape (each point being represented as a pair of coordinates), t is the number of columns of the covariance matrix (i.e. the number of eigenvalues used to code the training set of images, or equivalently the number of modes of the model), $\lambda_j$ is the value of each eigenvalue. $\lambda_r$ is the variance over the training set of images of the vector of residuals, and $$\alpha = \left(\frac{ns}{n(s-1) - t(n-s)}\right).$$

The details of this derivation are given in Appendix A.

Thus, for a fixed number of modes, t, to optimise $I_{Total}$ it is required to minimise $$F = (n + s)\sum_{j=1}^{t} \log(\lambda_j) + [n(s-1) - t(n+s)]\log(\lambda_r) \quad (10)$$

The number of modes to use, t, is chosen so as to be able to represent the training set to a given accuracy. In this instance the root mean square difference between points on the training set and the model reconstructions of the set are less than a suitable threshold. The threshold is typically chosen to be related to the estimated uncertainty in the original data.

The motivation behind the generation of the function F is to allow an optimal dense correspondence to be established automatically between a set of training shapes. As set out above, corresponding points are described in terms of parameterisation $\Phi_i$ of the boundary path of the shape. It is desired to find the global optimum of F in (10) with respect to the set of shape parameterisations $\{\Phi_i\}$.

The first described method of finding the global optimum of F is to use an explicit representation of $\{\Phi_i\}$ coupled with a stochastic search.

A representation of $\{\Phi_i\}$ is required that ensures a diffeomorphic mapping between each pair of training shapes. In 2-D this can be achieved by enforcing the ordering of corresponding points around the training shapes. In 3-D, however, no such ordering exists. The invention provides a new method of representation that guarantees diffeomorphic mapping without using an explicit ordering constraint. Here the method is described for 2-D shapes; Appendix B explains how it can be extended to 3-D.

A piecewise linear parameterisation is defined for each training shape by recursively subdividing boundary intervals by inserting nodes (landmarks). The position of each new landmark is coded as fraction of the boundary path length between neighbouring landmarks. Thus by constraining the subdivision parameters to the range [0,1] a hierarchical ordering is enforced where, at each level of the hierarchy, landmarks are positioned between those already present. This is illustrated by the example in FIG. 3 which demonstrates the parameterisation of a circle.

Referring to FIGS. 3a-d, the shape to be parameterized is a circle. An origin is marked onto the circle as shown in FIG. 3a (the origin is the first landmark). Moving in a clockwise direction the circumference around the circle is constrained to have a length of 1. A second landmark is positioned at 0.65, measured from the origin, as shown in FIG. 3b. This is the first level of the hierarchy. Starting from the origin the distance around the circle to the second landmark is constrained to be 1. A third landmark is positioned at 0.65, measured from the origin, as shown in FIG. 3c. Starting from the second landmark the distance around the circle to the origin is constrained to be 1. A fourth landmark is positioned at 0.8, measured from the second landmark, as shown in FIG. 3c. This the second level of the hierarchy. Further landmarks are added in the same manner, as shown in FIG. 3d, thereby providing the third level in the hierarchy.

Recursive subdivision can be continued until an arbitrarily exact parameterisation is achieved. Correspondence is assumed across the whole training set between equivalent nodes in the subdivision tree (i.e. equivalent levels of hierarchy).

A set of parameterisations $\{\Phi_i\}$ can be manipulated in order to optimise the objective function F. In practice the search space is high-dimensional with many local minima, and consequently it is preferred to use a stochastic optimisation method such as simulated annealing [15] or genetic algorithm search [16]. Both the simulated annealing [15] and genetic algorithm search are well known to those skilled in the art. A genetic algorithm was used to perform the experiments reported below.

The results of applying the invention to several sets of outlines of 2-D biomedical objects are now described. Qualitative results are shown by displaying the variation captured by the first three modes of each model (first three elements of b varied by ±2[standard deviations over training set]). Quantitative results are also given, tabulating the value of F, the total variance and variance explained by each mode for each of the models, comparing the automatic result with those for models built using manual landmarking and equally spaced points (boundary length parameterisation).

The first test used 17 hand outlines. The qualitative results in FIG. 4 show the ability to generalize plausibly to examples not in the training set. The results in tables 1*a-c* (FIGS. 13*a-c*) show that the automatic method produces a better model than both the equally spaced and manual model.

Figure 5:
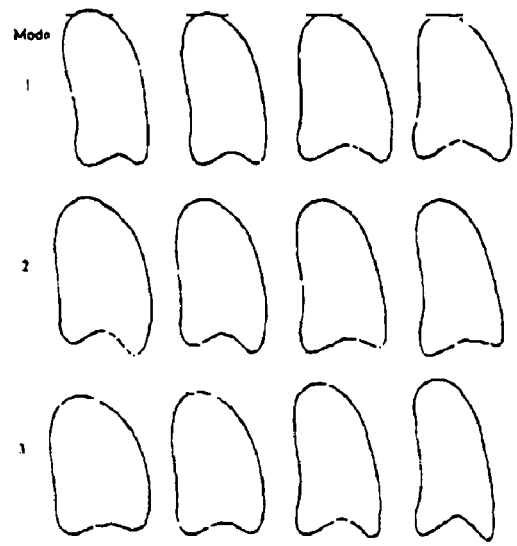

The second test used 38 outlines of left ventricles of the heart, segmented from echocardiograms. Again, FIG. 5 shows good generalization. The quantitative results are presented in tables 2*a-d* (FIGS. 14*a-d*). Once again, the automatic algorithm produces significantly better results than the other two methods.

Figure 6:
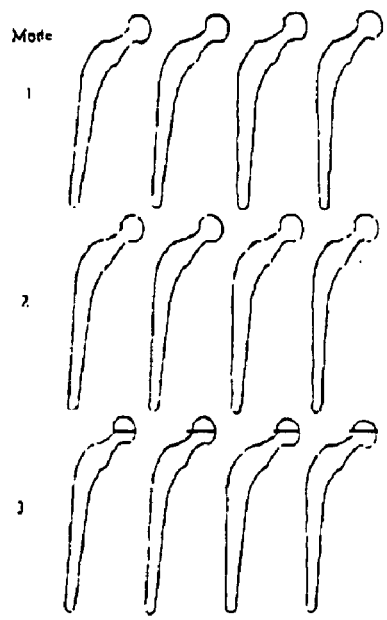

The final test used the outlines of 49 hip prostheses. The qualitative results in FIG. 6 show that there is little variation in the three most significant modes of the automatic model. This is because the only variation in shape is caused by the rotation of the prosthesis in the plane. It is also interesting to note in tables 3*a-3* (FIGS. 15*a-d*) that the model produced by equally spacing landmarks is better than the manual model. This is because equally-spaced points suffice as there is little variation, but the manual annotation adds noise to the model. As before, the automatically constructed model is best.

The second described method of finding the global optimum of F involves selecting corresponding points by uniformly sampling a continuous parameterisation $\Phi(m)$, of each shape, and then manipulating the set of parameterisations $\{\Phi_i\}$, in a way that minimises the value of $F_{min}$. The method described in this section is applicable to both open and closed curves; for clarity, the discussion is limited to the closed case.

Figure 8:
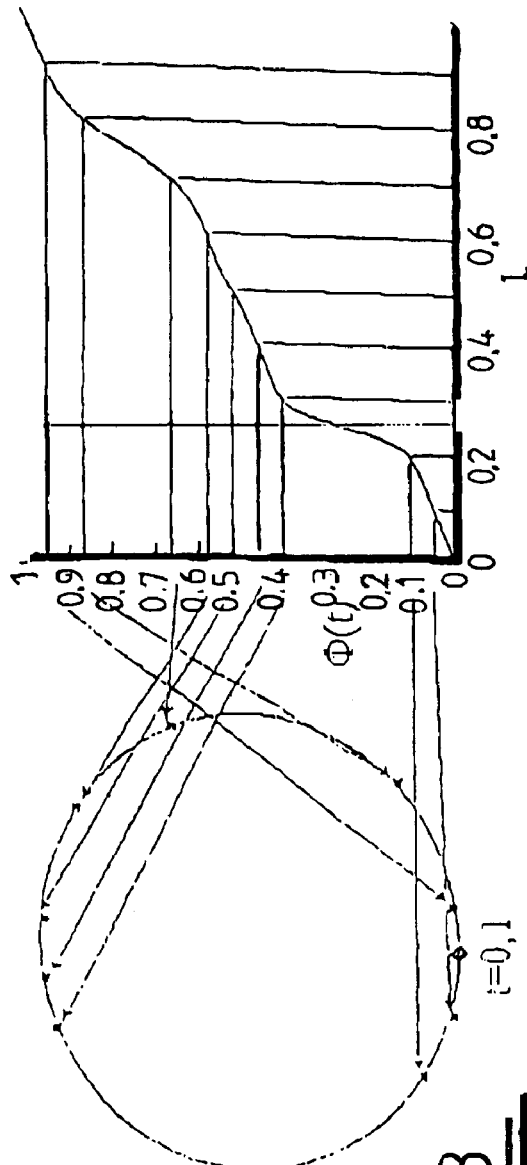
FIG. 8 is a FIG. 3 is a graph which illustrates continuous parameterisation.

A legal reparameterisation function $\Phi(m)$ is a monotomically increasing function of m, with a range ($0 \leq \Phi(m) \leq 1$). An example of such a function is shown in FIG. 8. Referring to FIG. 8, rather than determining a set of landmark points which together provide a parameterisation function (as shown in FIG. 2) it is desired instead to use two-dimensional curves to generate a parameterisation function $\Phi(m)$. Such a function can be represented as the cumulative distribution function of some normalised, positive definite density function $$\rho(x), \text{ where } \Phi(m) = \int_0^m \rho(x)\,dx$$

We choose, for example, to represent $\rho(x)$ as a sum of Gaussian kernels:

$$\rho(x) = c\left[1 + \sum_i \frac{A_i}{\sigma\sqrt{(2\pi)}}\exp\left(-\frac{1}{2\sigma_i^2}(x-o_i)^2\right)\right] \quad (11)$$

where the coefficients $A_i$ control the height of each kernel; $\sigma_i$ specifies the width and $a_i$ the position of the centre and c is the normalisation constant. The constant term is included to ensure that when all $A_i$'s are zero, $\Phi(m)$ is an arc-length parameterisation.

Given this representation of $\rho(x)$, $\Phi(m)$ is calculated $$\Phi(m) = \int_0^m \rho(x)\,dx \qquad (12)$$
$$= c\left[m + \sum_i \frac{A_i}{2}\text{erf}\left(\frac{m-a_i}{\sigma_i\sqrt{2}}\right) + \sum_i \frac{A_i}{2}\text{erf}\left(\frac{o_i}{\sigma_i\sqrt{2}}\right)\right]$$

where c is a normalisation constant $$c^{-1} = 1 + \sum_i \frac{A_i}{2}\text{erf}\left(\frac{m-a_i}{\sigma_i\sqrt{2}}\right) + \sum_i \frac{A_i}{2}\text{erf}\left(\frac{a_i}{\sigma_i\sqrt{2}}\right) \qquad (13)$$

and erf is a standard error function $$\text{erf}(x) = \frac{2}{\sqrt{\pi}}\int_0^x e^{-r^2}\,dr \qquad (14)$$

The parameterisation is manipulated by varying $\{A_i\}$, the heights of the kernels; the widths $\{\sigma_i\}$ and the positions $\{a_i\}$ are fixed. In other words, a set of Gaussian curves is combined together to generate a function whose cumulative value is the parameterisation of the shape (i.e. the set of curves together provide a curve of the type shown in FIG. 8).

If $n_k$ kernels are used to represent the parameterisation, the configuration space becomes ($n_k$s)-dimensional. One possibility is to use a stochastic optimisation method as described above, but a more effective approach would be desirable. This search space is generally too large for a direct optimisation scheme to converge rapidly and reliably. This problem is overcome by using the following multiresolution approach:

Begin with a single kernel of width $\sigma_l = \frac{1}{4}$, center at $a_l = \frac{1}{2}$ on each shape. The height, $A_l$ of the kernel on each shape is initialised to zero—equivalent to an arc-length parameterisation. Employ an optimisation algorithm to find the magnitude $A_l$, of the kernel on each shape that minimises F. Once these values are found, they are fixed and recorded.

At each subsequent iteration k, add an additional $2^{k-1}$ kernels of width $\frac{1}{4}(\frac{1}{2})^k$. The new kernels are positioned at intervals of $(\frac{1}{2})^k$ between m=0 and m=1 so that they lie halfway between the kernels added on previous iterations. The optimisation algorithm is used to find the best height for each kernel.

Continue recursively adding additional kernels until the parameterisation is suitably defined.

An advantage of this approach is that it avoids becoming trapped in a local minima of F since it starts at very low resolution and gradually steps up to higher resolutions.

The best alignment of the training set depends on the parameterisation of each shape. This is addressed by performing a Procrustes analysis [6] on the reparameterised shapes before evaluating $F_{min}$.

It will appreciated that other suitable forms of kernels may be used in place of the Gaussian kernels, for example Cauchy functions may be used.

In the experiments reported below, it has been assumed that a correspondence exists between the origins of each shape in the training set. If the correspondence does not exist, (12) must be modified so that $\Phi(t) \rightarrow (\epsilon + \Phi(t))\text{mod}1$, where s specifies the offset of the origin.

Qualitative and quantitative results of applying the second method to several sets of outlines of 2D biomedical objects have been obtained. An investigation of how the objective function behaves around the minimum and how it selects the correct number of modes to use has also been carried out.

The method was tested on a set of 17 hand outlines, 38 left ventricles of the heart, 24 hip prostheses and 15 cross-sections of the femoral articular cartilage. The algorithm was run for four iterations, giving 16 kernels per shape, A MATLAB implementation of the algorithm using a standard iterative optimisation algorithm takes between 20 and 120 minutes, depending on the size of training set. The results are compared with models built by equally-spacing points along the boundary and hand-built models, produced by identifying a set of 'natural' landmarks on each shape.

Figure 9:
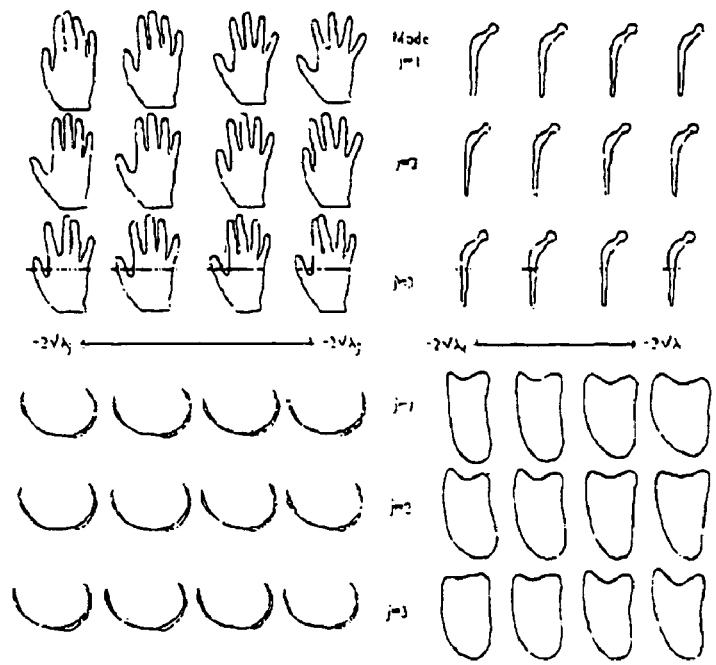
FIG. 9 is results obtained using the second embodiment of the invention.

FIG. 9 shows qualitative results by displaying the variation captured by the first three modes of each model (the first three elements of b varied by ±2σ). Quantitative results are given in table 2, tabulating the value of $F_{min}$, the total variance, and variance explained by each mode for each of the models.

The qualitative results in FIG. 9 show that the shapes generated within the allowed range of b are all plausible. The qualitative results in table 2 show that the method produces models that are significantly more compact than either the models built by hand of those obtained using equally-spaced points. It is interesting to note that the model produced by equally-spacing points on the hip prosthesis is more compact than the manual model. This is because equally-spaced points suffice as there is little variation, but errors in the manual annotation adds additional noise which is captured as a statistical variation.

Figure 10:
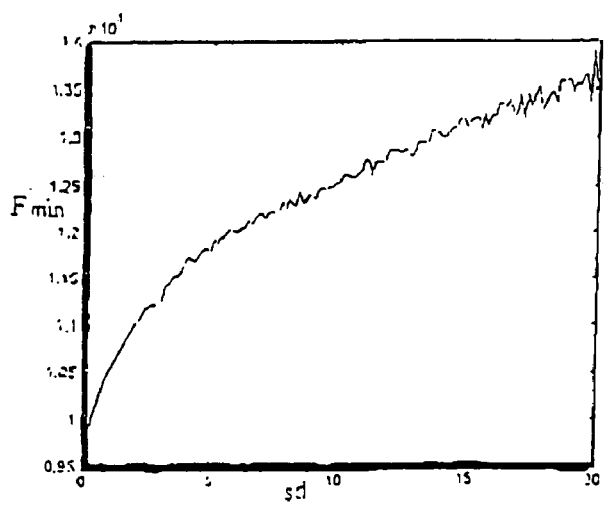
FIG. 10 is further results obtained using the second embodiment of the invention.

To demonstrate the behavior of the objective function some corresponding points were taken from the automatically generated hand model, and random noise was added to each one. FIG. 10 shows a plot of $F_{min}$ against the standard deviation of the noise. The plot shows that as the points are moved further away from their corresponding positions, the value of $F_{min}$ increases—the desired behavior.

This method of describing parameterisation can also be applied in 3D.

The second method of parameterisation, described above, uses two dimensional kernels to determine the parameterisation. The third method, described below, is similar to the second method but uses landmark points rather than Gaussian kernels to represent the parameterisation.

The training data used by the third method are a set $\{\Psi_i\}$ of shapes that are represented as curves in two dimensions:

$$\Psi_i(t)=[\Psi_i^x(t),\Psi_i^y(t)], 0 \leq t \leq 1 \qquad (15)$$

The shape outlines can be open $[\Psi_i \neq \Psi_i(1)]$ or closed $[\Psi_i(0) \neq \Psi_i(1)]$ It is required to find the optimal set of parameterisations $\{\Phi_i\}$ of these curves, where $\Phi_i$ is a diffeomorphic mapping:

$$\Psi_i(t) \rightarrow \Psi_i(\Phi_i(t)), \Phi_i\{0,1\} \rightarrow \{0,1\} \qquad (16)$$

A piecewise-linear approximation to the parameterisation $\Phi_i$ is used by specifying a set of $n_c$ control points, $\{p_k\}$ on each shape and equally spacing n/k points along the boundary between each interval. The configuration space is therefore $(n_c \cdot n_s)$-dimensional. This search space is generally too large for a direct optimisation scheme to converge rapidly and reliably. This is overcome by using the following multiresolution approach.

Figure 11:
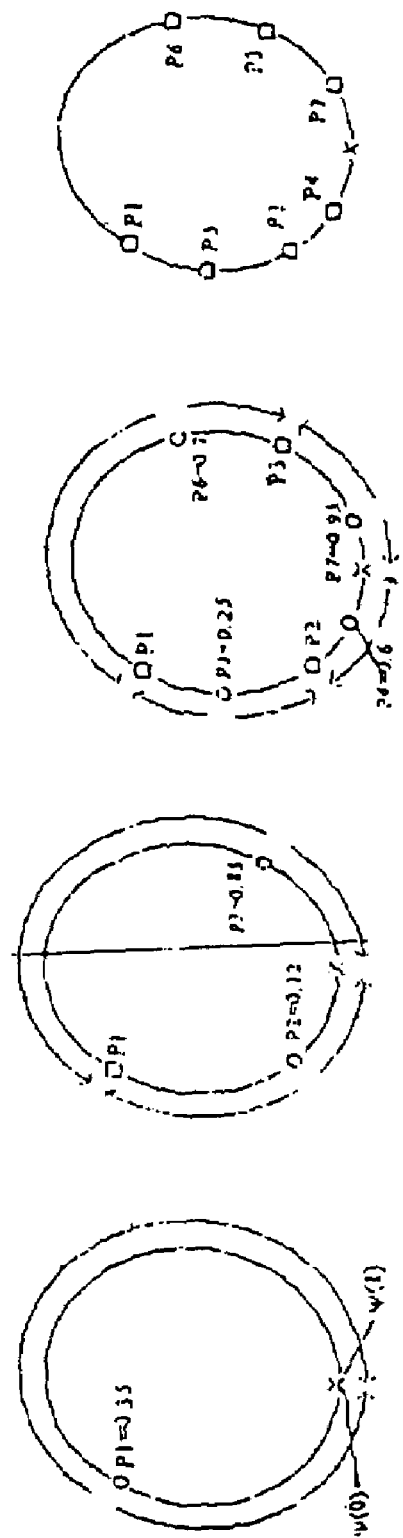
FIG. 11 is a diagram which illustrates discrete parameterization by the third embodiment of the invention.

Begin with one control point, $p_{1i}$, on each shape. Add n/2 equally-spaced points along the contours between $\Psi_i(0)$ and $\Psi_i(p_{1i})$ and between $\Psi_i(p_{1i})$ and $\Psi_i(0)$. Search for the best set of values for $\{p_{1i}\}$ in the range [0,1]. A circle to be parameterised is shown in FIG. 11a. The 'X' represents the origin, the circles represent the current (flexible) control points and the squares represent the fixed control points. At each iteration, the current control points are allowed to move between the endpoints of the arrow. For the first iteration, the best control point $p_{1i}$ is found to be at 0.35. Once the best values are found, fix and record them.

Place two additional control points $p_{2i}$ and $p_{3i}$ between 0 and $p_{1i}$ and between $p_{1i}$ and 1 respectively. Equally spaced n/4 points between $[0,p_{2i}], [p_{3i}, p_{1i}], [p_{1i}, p_{31}]$ and $[p_{3i}, 1]$. Referring to FIG. 11b the best control points $p_{2i}$ and $p_{3i}$ are 0.12 and 0.85 respectively. Fix and record the optimal positions of $\{p_{2i}\}$ and $\{p_{3i}\}$.

Continue adding additional control points in a similar fashion between the fixed control points $\{p_1\}$ until the parameterisation is suitably defined. Referring to FIG. 11c the best control points $p_{4i}, p_{5i}, p_{6i}$ and $p_{7i}$ are 0.6, 0.25, 0.7 and 0.95. FIG. 11d shows the full set of best control points.

At each iteration, the position of each control points is initialised as halfway along its allowed range—the equivalent of an arc-length parameterisation. Since an explicit ordering constraint has not been used, the method may be used on shaped in 3D (see [19] for details).

The pose of each shape affects the value of F. It is therefore required to optimise the four parameters that allow a rigid transformation of each shape: translations $d_x, d_y$, scaling s and rotation θ.

It has been found that adding an additional $4n_s$ dimensions to each iteration significantly slows the optimisation and introduces many additional false minima. Better results can be achieved by performing a Procrustes analysis [12] of the reparameterised shapes after each iteration.

The third method was tested on a set of 17 hand outlines, 38 left ventricles of the heart. 24 hip prostheses and 15 outlines of the femoral articular cartilage. The algorithm was run for four iterations, giving 16 control points per shape. The results are compared to models built by equally-spacing points along the boundary and hand-built models, produced by identifying a set of natural landmarks on each shape.

In FIG. 13 qualitative results are shown by displaying the variation captured by the first three modes of each model (the first three elements of b varied by ±2σ). Quantitative results are given in table 3, tabulating the value of F, the total variance, and variance explained by each mode for each of the models. The automatic results are compared with those obtained for models built using manual landmarking and equally spaced points.

Figure 12:
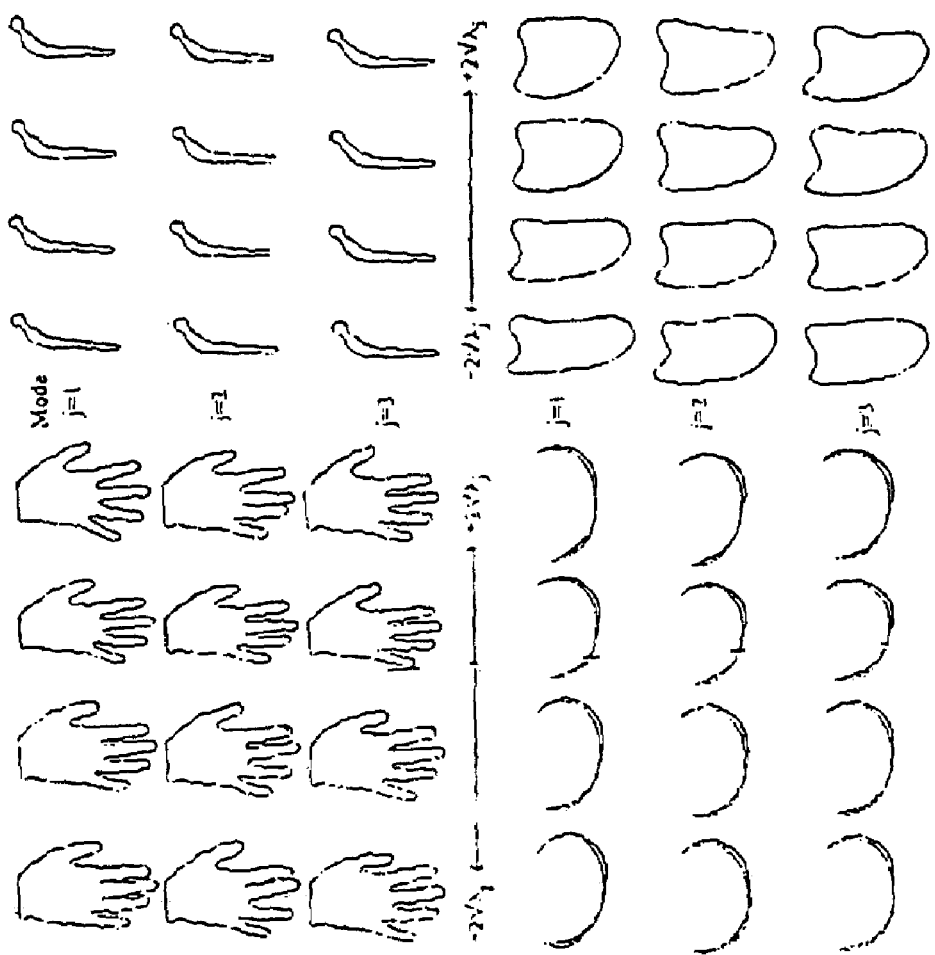
FIG. 12 is results obtained using the second embodiment of the invention.

The qualitative results in FIG. 12 show that the shapes generated within the allowed range of b are all plausible. The quantitative results in table 3 show that the method produces models that are significantly more compact than either the models built by hand or those obtained using equally-spaced points. It is interesting to note that, although the total variance of the hand-built model of the heart ventricle is larger than the equally-spaced model, the value of the objective function is lower. This is because much of the variation of the hand-built model is captured within the first few modes whereas the equally-spaced model requires more modes to describe the same amount of variation. This is the behavior that is desired from the objective function—the ability to represent much variation with few modes.

The invention provides an objective function that can be used to evaluate the quality of a statistical shape model. The expression used has a theoretical grounding in Information Theory, is independent of quantisation error and unlike other approaches [4, 6], does not involve any arbitrary parameters. As well as providing good results when used as an objective function for automatically building statistical shape models, the function may also be used to calculate the correct number of modes to use for a given model. The objective function includes a $\Sigma\log(\lambda_i)$ term which is equivalent to the determinant of the covariance matrix, as used by Kotcheff and Taylor [6], but the more complete treatment here shows that other terms are also important.

Three novel representations of correspondence have been described that enforce diffeomorphic mapping and are applicable in 2-D and 3-D. It has been found that these new representations improve the performance of genetic algorithm search in comparison with the representation described by Kotcheff and Taylor [6] and allow more direct methods of optimisation to be applied. The results described in relation to 2-D objects offer a significant improvement over those from a hand-built model. The test has been run with different random seeds and achieved almost identical results each time.

The various approaches described here can also be extended in modelling full appearance (grey-levels, not just shape) as described in paper [20]. Since the mathematical description of the appearance model is identical to the shape model this is straight forward.

Appendix A: Quantisation Effects $I_{Total}$ in (7) is a function of the quantisation parameters $\delta_m$, $\{\delta_j\}$, $\delta_b$ and $\delta_r$. Since we wish ultimately to minimise $I_{Total}$ with respect to $\{\Phi_i\}$ we need first to find the minimum with respect to these parameters. First, we need to determine what quantisations $\delta_m$, $\{\delta_j\}$, $\delta_b$ and $\delta_r$ are required to achieve a quantisation error $\delta = 2^{-k}$ in the final reconstruction. We assume that by quantising a parameter, we effectively add noise to that parameter. We have used error propagation to estimate the effects of noise on the final reconstruction.

In our linear model (2), noise of variance $\sigma^2$ on the elements of $\overline{x}$ induces noise of variance $\sigma^2$ on $x_i$. Similarly, noise of variance of $\sigma^2$ on the elements of $b_t$ can be shown to induce an average of noise of variance $\sigma^2/2$ on the elements of $x_i$. Noise of variance $\sigma^2$ on the elements of the $j^{th}$ column of P induces an average noise of variance $\lambda_j\sigma^2$ on each element of $x_i$.

Quantising a value to $\delta$ induces noise with a flat distribution in $[-\delta/2, \delta/2]$ and thus a variance of $\delta^2/12$. Thus quantising $\overline{x}$, P and $b_t$, causes an additional error that must be corrected by the residual term, $r_i$. In effect, the variance of the residual is increased from the original $\lambda_r$. Taking this into account, the variance on the elements of the residual is given by $$\lambda'_r = \lambda_r + \frac{1}{12}\left(\delta_m^2 + \frac{t}{2n}\delta_b^2 + \sum_{j=1}^{t}\lambda_j\delta_j^2\right) \tag{11}$$

Using the central limit theorem we assume that the residuals are normally distributed. $\lambda_r^1$ is substituted for $\lambda_r$ in (7) giving $$I_{Total} = nk_m + n\sum_{j=1}^{t}k_j + s\sum_{j=1}^{t}[k_b + \tag{12}$$

$$0.5\log(2\pi e\lambda_j)] + sn[k + 0.5\log(2\pi e\lambda'_r)]$$

We can now find the minimum of $I_{Total}$ with respect to $\delta_m$, $\{\delta_j\}$, $\delta_b$ and $\delta_r$. By equating the differentials to zero, we can show that at the optimum $$\delta_m^3 = 2^{-2kn} = 12\lambda_r^1/s \tag{13}$$

$$\delta_j^2 = 2^{-2kj} = 12\lambda_r^1/(s\lambda_j) = \delta_m^2/\lambda_j \tag{14}$$

$$\delta_n^2 = 2^{-2kr} = 12\lambda_r^1 = s\delta_m^2 \tag{15}$$

Substituting (12), (13) and (14) into (10) gives $$\lambda'_r = \alpha\lambda_r \text{ where } \alpha = \left(\frac{ns}{n(s-1)-t(n-s)}\right) \tag{16}$$

Appendix B: Extension to 3D

This appendix contains a description of how our parameterisation can be extended to 3-D. Our ultimate goal is to build 3-D statistical models of biomedical objects.

To ensure that all shape instances are legal, we must constrain each landmark to lie on the surface. A seemingly plausible solution is to use spherical co-ordinates whose centre is at the centre of gravity of the shape. This representation, however, is not unique, in that two different points on the surface may have the same co-ordinates. Consequently, triangles can flip over between examples and as this is captured as a statistical variation, the specificity and compactness of the model is affected. We can overcome this by flattening the surface to that of a unit sphere using the conformal mapping technique of Angenent et al [18]. This method solves a second order partial differential equation to provide a function that maps any point on the original surface to that of a unit sphere. As the mapping is a diffeomorphism, each point on the original surface has a unique, corresponding point on the sphere. This allows us to navigate the shapes surface using two spherical co-ordinates.

Figure 7:
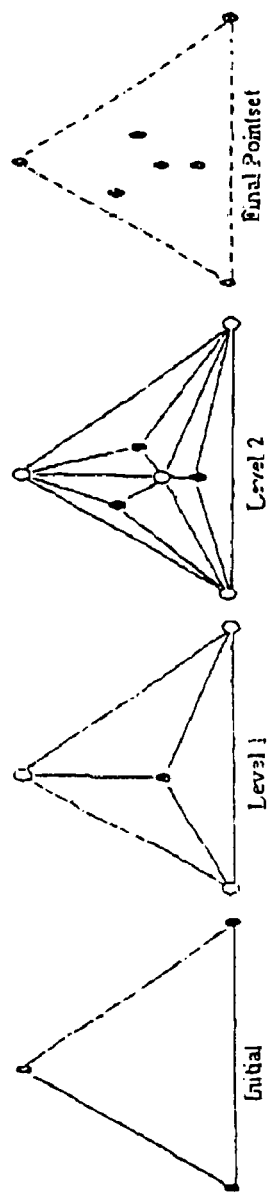
FIG. 7 is a diagram which illustrates the application of the invention to 3-D surfaces.

We may now use hierarchical parameterisation to position landmarks on the sphere. We guarantee that the landmarks stay in order by constraining each point to lie inside the spherical triangle formed by the triple of points from the hierarchy tier above The parameterisation is now the position of the point in relation to the three vertices of the triangle. This allows us to constrain each landmark to lie between its neighbouring points, thus defining an explicit correspondence across the entire set of shapes. When a new landmark is added, it forms three new triangles, as demonstrated in FIG. 7. Once all the landmark points have been positioned on the sphere, they can be projected onto the shapes surface using the inverse of the conformal mapping and evaluate them using our objective function.

An alternative approach is the extension of the continuous parameterisation of a line (given in equation 16)—the parameterisation of homeomorphisms on the sphere (i.e. mappings which do not induce folding or tearing of the sphere). If we define on parameterisable transformation which does not tear or fold, we can generate a general transformation by applying a sequence of such individual transformation. Below we describe one such transformation, which essentially stretches the area around a particular point and compresses the area at the opposite side of the sphere. By applying a sequence of such stretches, centred on different points, we can generate a wide variety of homeomorphisms. To automatically build a model we optimise the parameters of these individual transformations so as to minimise the objective function defined above.

Generating a Set of Homeomorphisms on the Sphere

We wish to construct a parameterised set of exact homeomorphisms on the sphere, that is, a set of mappings from the sphere to itself which are continuous, one-to-one, and onto (i.e. no gaps or wrinkles). We would also like the mapping to be differentiable everywhere other than at a finite number of isolated points. We would like the members of this set to be localised in terms of their action, and continuous with the identity. From a computational point of view, we would like the set to use as a few parameters as possible, and be computationally efficient (i.e. involve only the evaluation of elementary functions).

Theta Transformations

We can construct such a set as follows. Consider an arbitrary point P on the unit sphere. We construct spherical polar co-ordinates ($\theta,\phi$) on the sphere such that P corresponds to the point $\theta=0$. Let us now consider a set of homeomorphisms that re-parameterises the $\theta$ co-ordinate:

$$\theta \to f(\theta,\phi) \quad (1)$$

We first take the rotationally symmetric case where $f(\theta,\phi)=f(\theta)$. For the mapping to be differentiable over the range $0<\theta<\pi$ and continuous with the identity, $f$ must be a differentiable non-decreasing monotonic function over the range $0<\theta<\pi$, with $f(0)=0$, $f(\pi)=\pi$. Any such monotonic function $f$ can be re-written in terms of the cumulative distribution function of some density function $p(\theta)$, defined over the range $0<\theta<\pi$.

We take as our normalised density function a constant term plus a wrapped Cauchy distribution. The wrapped Cauchy [1] is a normalisable, uni-modal distribution for circular data, or variable width, which has an analytic indefinite integral:

$$p(\theta) = \frac{1}{N}\left[1 + A\left(\frac{1-\alpha^2}{1+\alpha^2 - 2\alpha\cos\theta}\right)\right] \quad (2)$$

where $N=\pi[1+A]$
Hence:

$$f(\theta) = \pi \int_0^\theta d\varphi\, p(\varphi)$$

$$= \frac{1}{1+A}\left[\theta + A\arccos\left(\frac{(1+\alpha^2)\cos\theta - 2\alpha}{1+\alpha^2 - 2\alpha\cos\theta}\right)\right]$$

where ($\alpha \equiv e^{-a}, a \in \Re$) is the width-parameter is the width-parameter of the Cauchy, with amplitude $A \geq 0$. In this case, the mapping is also differentiable everywhere.

We can extend this to the non-symmetric case if we make the amplitude A a smooth function of the co-ordinate $\phi$. One such way to do this is to again use the wrapped Cauchy distribution to obtain:

$$A \to A(\varphi) = A_c\left[\frac{1-\beta^2}{1+\beta^2 - 2\beta\cos\varphi} - \frac{1-\beta^2}{(1+\beta)^2}\right] \quad (3)$$

where $\beta \equiv e^{-b}$ is the width of the subsidiary Cauchy, and we have chosen the formulation such that $A(\phi)$ has a minimum value of zero. Note that we have also introduced a further parameter in terms of the definition of the zero of the $\phi$ co-ordinate.

This mapping is differentiable everywhere except at the point P and the point diametrically opposite to it.

Shear and Twist

We can also consider transformations of the $\phi$ co-ordinate, which are equivalent to shearing and twisting the sphere about the axis defined by our point P. So, for example, we could consider a re-parameterisation of the form:

where $$\varphi \to \varphi + g(\theta) \text{ where } g(\theta) = \left(\frac{B}{2\pi}\right)\frac{1-\tau^2}{1+\tau^2 - 2\tau\cos(\theta - \theta_0)}, \quad (4)$$

$$\tau = e^{-t}, t \in \Re$$

where B is the amplitude, $\tau$ the width and $\theta_0$ the center. This transformation is continuous with the identity at B=0. It can also be localised about $\theta=\theta_0$ in the limit of zero width.

Combined Transformations

We take a set of transformations as defined above, each about a different point, and apply them in succession to generate a combined transformation. In general, the final transformation will depend on the order on which we compose the individual transforms.

REFERENCES

1. K. V. Maridia *Statistics of Directional Data*. Academic Press, London, 1972

REFERENCES

1. Cootes, T., A. Hill, and C. Taylor, *The use of Active shape models for locating structures in medical images*. Image and Vision Computing, 1994. 12: p. 353-366.
2. Cootes, T., et al., *Active shape models—their training and application*. Computer Vision and Image Understanding, 1995. 61: p. 38-59.
3. Brett, A. D. and C. J. Taylor, *A Method of Automated Landmark Generation for 3D PDM Construction*. Image and Vision Computing, 2000. 18(9): p. 739-748.
4. Hill, A. and C. Taylor, *Automatic landmark generation for point distribution models*, in British Machine Vision Conference. 1994. Birmingham, England: BMVA Press.
5. Hill, A. and C. J. Taylor, *A frame-work for automatic landmark identification using a new method of non-rigid correspondence*. IEEE Transactions on Pattern Analysis and Machine Intelligence, 2000.
6. Kotcheff, A. C. W. and C. J. Taylor, *Automatic Construction of Eigenshape Models by Direction Optimisation*. Medical Image Analysis, 1998. 2: p. 303-314.
7. Baumberg, A. and D. Hogg, *Learning Flexible Models from Image Sequences*, in 3rd European Conference on Computer Vision, Stockholm, Sweden. 1994. p. 299-308.
8. Kelemen, A., G. Szekely, and G. Gerig, *Elastic model-based segmentation of 3-D neuroradiological data sets*. Ieee Transactions On Medical Imaging, 1999. 18(10): p. 828-839.
9. Benayoun, A., N. Ayache, and I. Coben, *Adaptive meshes and nonrigid motion computation*. in International Conference on Pattern Recognition. 1994. Jerusalem, Israel.
10. Kambhamettu, C. and D. B. Goldgof, *Point Correspondence Recovery in Non-rigid Motion*, in IEEE Conference on Computer Vision and Pattern Recognition. 1992. p. 222-227.

11. Bookstein, F. L., *Landmark methods for forms without landmarks: morphometrics of group differences in outline shape*. Medical Image Analysis. 1997. 1(3): p. 225-243.
12. Goodall, C., *Procrustes Methods in the Statistical Analysis of Shape*. Journal of the Royal Statistical Society, 1991. 53(2): p. 285-339.
13. Rangagajan, A., et al., *The Softassign Procrustes Matching Algorithm*, in 15*th Conference on Information Processing in Medical Imaging*. 1997. p. 29-42.
14. Therrien, C. W., *Decision Estimation and Classification*: 1989: John Whiley and Sons.
15. Kirkpatrick, S., C. Gelatt, and M. Vecchi, *Optimisation by Simulated Annealing*. Science, 1983. 220: p. 671-680.
16. Goldberg, D. E. *Genetic Algorithms in Search. Optimisation and Machine Learning*. 1989: Addison Wesley.
17. Geiger, B., Three-dimensional modelling of human organs and its application to diagnosis and surgical planning, 1993, Technical Report, INRIA, France.
18. Angenent, S., et al., *On the laplace-beltrami operator and brain surface flattening*. IEEE Trans. Medical Imaging, 1999. 18: p. 700-711.
19. Davies, Rh. H. T. Cootes and C. J. Taylor, A Minimum Description Length Approach to Statistical Shape Modelling, in IPMP'01, (to appear).
20. T. F. Cootes, G. J. Edwards, and C. J. Taylor, Active Appearance Models. European Conference on Computer Vision, vol 2, pages 484-498, 1998.

What is claimed is:

1. A computer implemented method of building a statistical shape model by automatically establishing correspondence between a set of two-dimensional shapes or three-dimensional shapes, the method comprising:
   (a) determining a parameterization of each shape, building a statistical shape model using the parameterization, using an objective function to automatically provide an output which indicates a quality of the statistical shape model, wherein the output of the objective function is a measure of the quantity of information required to code the set of shapes using the statistical shape model;
   (b) performing step (a) repeatedly for different parameterizations and comparing the quality of the resulting statistical shape models using output of the objective function to automatically select a parameterization based upon said output of the objective function; and
   (c) outputting the selected statistical shape model.

2. A method according to claim 1, wherein each parameterization used to perform step (a) is selected using an optimization method based upon previous parameterizations and the quality of the statistical shape models generated using those parameterizations as indicated by the output of the objective function.

3. The method according to claim 2, wherein the output of the objective function comprises a value indicative of the amount of information required to code parameters of the model, and a value indicative of the information required to code residuals for the set of shapes.

4. The method according to claim 3, wherein the output of the objective function further comprises a value indicative of the amount of information required to code mapping between parameters and the shapes.

5. The method according to claim 4 wherein for a given parameterization the objective function provides a single scalar output.

6. The method according to claim 5 wherein the single scalar output comprises a combination of the value indicative of the amount of information required to code parameters of the model, the value indicative of the information required to code residuals for the set of shapes, and the value indicative of the amount of information required to code mapping between parameters and the shapes.

7. The method according to claim 4, wherein the mapping comprises a mean vector and a covariance matrix.

8. The method according to claim 3 wherein the parameters of the model are parameter vectors, and the average amount of information per parameter vector is determined and multiplied by the number of shapes in a training set, to provide the value indicative of the amount of information required to code parameters of the model.

9. The method according to claim 3 wherein the residuals are residual vectors, and the average amount of information per residual vector is determined and multiplied by the number of shapes in the training set, to provide the value indicative of the information required to code residuals for a complete set of training shapes.

10. The method according to claim 9, wherein the number of residuals in each residual vector is twice the number of parameterizations used to generate the model.

11. The method according to claim 1, wherein the number of modes of variation of the model is selected to represent a training set to a given accuracy.

12. The method according to claim 1, wherein the boundary of each two-dimensional shape of a training set of shapes is recursively subdivided by inserting landmarks, the parameterization of the boundary being represented by the position of each landmark as a fraction of boundary path length between preceding and following landmarks.

13. The method according to claim 12, wherein the output parameterization is determined using a stochastic optimization method.

14. The method according to claim 1 wherein a set of curves is used to determine a parameterization function for the training set.

15. The method according to claim 14, wherein the set of curves is a cumulative density function.

16. The method according to claim 15, wherein the cumulative density function comprises a sum of kernel curves.

17. The method according to claim 16, wherein the cumulative density function is determined by combining increasing numbers of kernel curves to provide increasing resolution levels, and the output parameterization function is determined using the output of the objective function for each resolution level.

18. The method according to claim 16 wherein the kernel curves are Gaussian functions.

19. The method according to claim 16 wherein the kernel curves are Cauchy functions.

20. The method according to claim 16 wherein the kernel curves are two-dimensional curves.

21. The method according to claim 16 wherein the kernel curves are three-dimensional curves.

22. The method according to claim 1 wherein the boundary of each shape of the training set is parameterized by specifying a set of control landmarks used to determine a parameterization function.

23. The method according to claim 22, wherein the parameterization function is determined for increasing numbers of control landmarks to provide increasing resolution levels, and the output parameterization function is determined using the output of the objective function for each resolution level.

24. The method according to claim 22 wherein equally spaced landmarks are provided between the control landmarks.

25. The method according to claim 1, wherein the shape and grey-level appearance are both included in the model.

26. A computer implemented method of automatically parameterizing a set of three-dimensional shapes, each having a consistent topology, the method comprising automatically performing each of the following steps:
(a) mapping each three-dimensional shape to a parameterized form of the consistent topology,
(b) applying a set of landmarks to the parameterized form for a given level of resolution, each landmark being constrained to lie inside a spherical triangle formed by a triple of landmark points of a lower resolution level,
(c) upon the completion of the application of the set of landmarks for the resolution level, projecting the set of landmarks onto the three-dimensional shapes,
(d) building a statistical shape model using the set of landmarks of the resolution level,
(e) using an objective function to provide an output which indicates a quality of the statistical shape model determined using the set of landmarks of the resolution level wherein the output of the objective function is a measure of the quantity of information required to code the set of shapes using the statistical shape model;
(f) comparing the output with output determined using a different set of landmarks having the same level of resolution,
(g) repeating steps (a) to (f) to select a set of landmarks based upon said output of the objective function,
(h) repeating steps (a) to (g) at a higher level of resolution, and
(i) outputting a selected set of landmarks as parameters corresponding to said three-dimensional shapes.

27. A computer implemented method of automatically parameterizing a set of three-dimensional shapes, each having a consistent topology, the method comprising automatically performing each of the following steps:
(a) mapping each three-dimensional shape to a parameterized form of the consistent topology,
(b) applying a set of landmarks to the parameterized form,
(c) modifying the locations of the landmarks by applying a transformation,
(d) projecting the set of landmarks onto the three-dimensional shapes,
(e) building a statistical shape model using the set of landmarks,
(f) using an objective function to provide an output which indicates a quality of the statistical shape model determined using the set of landmarks, wherein the output of the objective function is a measure of the quantity of information required to code the set of shapes using the statistical shape model;
(g) comparing the output with output determined using landmarks having different locations,
(h) repeating steps (c) to (g) to determine an output set of landmarks based upon said output of the objective function, and
(i) outputting a selected set of landmarks as parameters corresponding to said three-dimensional shapes.

28. The method according to claim 27, wherein the transformation comprises, for a selected landmark, pushing other landmarks away from the selected landmark along the surface of the simple form, or pulling other landmarks towards the selected landmark along the surface of the parameterized form.

29. The method according to claim 28, wherein the transformation is defined by a wrapped kernel.

30. The method according to claim 29, wherein the wrapped kernel is a wrapped Cauchy distribution.

31. The method according to claim 29, wherein the wrapped kernel is a wrapped Gaussian distribution.

32. The method according to claim 28 wherein the parameterized form is a sphere or a torus.

33. A computer implemented method of building a statistical appearance model by automatically establishing correspondence between a set of images, the method comprising:
(a) determining a parameterization of each image, building a statistical model representing shape and appearance using the parameterization, using an objection function to automatically provide an output which indicates a quality of the statistical model, wherein the output of the objective function is a measure of the quantity of information required to code the set of images using the statistical model;
(b) performing step (a) repeatedly for different parameterizations and comparing the quality of the resulting statistical models using output of the objective function to automatically select a parameterization based upon said output of the objective function; and
(c) outputting the selected statistical model.

34. A method according to claim 33, wherein the statistical appearance model is an active appearance model.

* * * * *